United States Patent Office 3,393,204
Patented July 16, 1968

3,393,204
HETEROCYCLIC COMPOUND AND USE
Michael Cais, 21 Smolenskin St., Ahuza, Haifa, Israel, and William Taub, 43 Ben Zion St., Rehovoth, Israel
No Drawing. Continuation-in-part of application Ser. No. 274,928, Apr. 23, 1963. This application Feb. 15, 1966, Ser. No. 527,478
1 Claim. (Cl. 260—343.5)

ABSTRACT OF THE DISCLOSURE

The compound 6-methyl-t-tert.butyl-4-bromo-2,3,5-trioxotetrahydropyran which is useful for preventing the sludging of mammalian blood.

---

This application is a continuation-in-part of our copending United States application Ser. No. 274,928, filed Apr. 23, 1963, now U.S. Pat. No. 3,344,150.

This invention relates to a new method for the inhibition of sludging of blood, thrombus formation and platelet adhesiveness and, more particularly, to the novel chemical 6-methyl-6-tert.butyl-4-bromo-2,3,5-trioxotetrahydropyran and to its use for those purposes.

The new substance 6-methyl-6-tert.butyl-4-bromo-2,3,5-trioxotetrahydropyran, of this invention has valuable pharmacological properties in that, among other uses, it is an anti-inflammatory agent and an anti-coagulant and it prevents the sludging of mammalian blood by inhibiting thrombus formation and platelet adhesiveness. This is all the more surprising as the closest known representative of this type, i.e. 6,6-dimethyl-2,3,5-trioxotetrahydropyran, is virtually inactive pharmacologically. The 6-methyl-6-tert.butyl-4-bromo-2,3,5-trioxotetrahydropyran of the present invention is thus useful as an antithrombotic agent.

The compound of the present invention has the tautomeric formulae

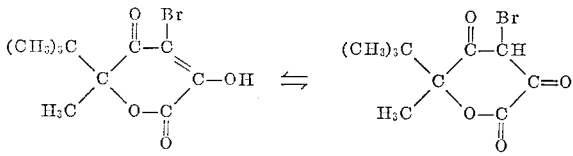

is named 6-methyl-6-tert.butyl-4-bromo-2,3,5-trioxotetrahydropyran and is prepared by bromination (as with liquid bromine in methylene chloride or with N-bromosuccinimide together with a catalytic amount of benzoyl peroxide in carbon tetrachloride) of 6-methyl-6-tert.butyl-2,3,5-trioxotetrahydropyran. The latter compound is prepared by the general procedure used to make the corresponding 6,6-dimethyl compound by Diels and Johlin, Ber. 44, 403–410 (1911) or by using known methods in the following reaction scheme:

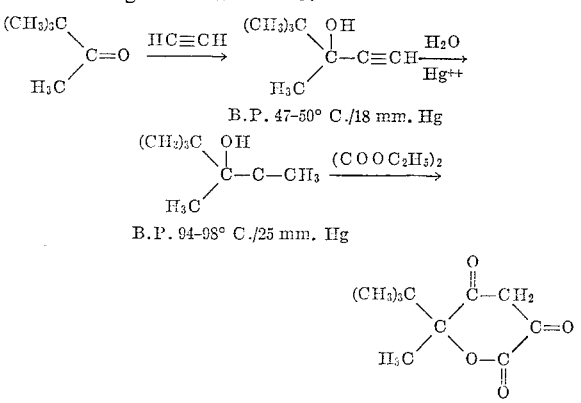

The following example will illustrate in detail a method of preparing the compound of the present invention.

Example.—6-methyl-6-tert.butyl-2,3,5-trioxotetrahydropyran

In a 3-necked flask fitted with stirrer, reflux condenser and dropping funnel there were placed 6 g. (0.25 mole) sodium hydride and 100 ml. dry diethyl ether. To the vigorously stirred mixture, 12 g. (0.25 mole) ethanol was added dropwise at such a rate as to maintain gentle reflux. After the addition of all the ethanol in the course of about one-half hour, the mixture was refluxed for another two hours by which time all the sodium hydride had reacted. To the cooled solution, 36.5 g. (0.25 mole) freshly distilled diethyl oxalate was added slowly and the mixture was stirred for another half-hour under cooling (ice-salt bath). At the end of this time, 35 g. (0.25 mole) of methyl-tert.butyl-acetyl carbinol,

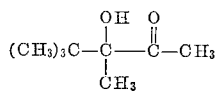

was slowly added to the continuously cooled and stirred reaction mixture; a short time after the beginning of this addition, the solution turned cloudy and a precipitate began to form. After the addition was completed, stirring was continued for another four hours. The reaction mixture was then poured into iced-water and the aqueous mixture was extracted twice with ether to remove unreacted materials. The aqueous layer was acidified with aqueous hydrochloric acid and the white-yellow precipitate formed was filtered to yield about 55 g. Crystallization from benzene yielded white crystals (40 g.) of M.P. 145–146° C.

Analysis.—Calc'd for $C_{10}H_{14}O_4$: C, 60.59; H, 7.12. Found: C, 60.99; H, 7.34.

If upon acidification of the aqueous mixture, the product is oily and does not crystallize, it is extracted with ether and dried over $Na_2SO_4$, then the ether is evaporated and leaves the residue in crystalline form.

6-methyl-6-tert.butyl-4-bromo-2,3,5-trioxotetrahydropyran 45 g. (0.225 mole) of 6-methyl-6-t-butyl-2,3,5-trioxotetrahydropyran was dissolved in 250 ml. methylene chloride and the solution cooled in an ice bath, then a solution of 12 ml. (0.225 mole) bromine in 70 ml. methylene chloride was added dropwise in the course of 45 minutes whereafter the reaction mixture was stirred for another 30 minutes at room temperature. Then the solvents were evaporated in vacuo (water pump). The crude product, 6-methyl-6-t-butyl-4-bromo - 2,3,5-trioxotetrahydropyran, was recrystallized from a mixture of equal volumes of methylene chloride and petroleum ether. Yield: 40 g. of a pure product of M.P. 167–168° C.

The same product is obtained by dissolving about 0.028 mole 6-methyl-6-tert.butyl - 2,3,5 - trioxotetrahydropyran and 0.025 mole N-bromosuccinimide together with a catalytic amount of benzoyl peroxide in 100 ml. $CCl_4$, refluxing the solution for 30 minutes, cooling, filtering to remove precipitated succinimide and evaporating to leave as the residue the desired product which is recrystallized as before.

In the following table the anticoagulant action of the compound of the present invention is compared with that of the corresponding nonbrominated compound. Thus in the table under "Compound," "Nonbromo" refers to 6-methyl-6-tert. butyl-2,3,5 - trioxotetrahydropyran and "Bromo" refers to 6-methyl-6-tert. butyl-4-bromo-2,3,5-trioxotetrahydropyran.

Column II indicates the minimum "active concentration" in mg. required for the prolongation of the recalcification time of 0.2 ml. of rabbit plasma to or above 20 minutes.

Column III indicates the approximate lethal dose ($LD_{50}$) in mg./kg. of I. P. mice. (I.P.=intraperitoneal).

Column IV indicates the therapeutic ratio or index which is the quotient of the figures of Column III divided by those of Column II. Of course, the therapeutic value of a substance is the greater, the higher its therapeutic ratio, for if the latter is too small, that is, if the minimum active dose approaches the lethal dose, the administration of such substance is too dangerous.

TABLE

| Compound: | II | III | IV |
|---|---|---|---|
| Nonbromo | 15 | 1,500 | 100 |
| Bromo | 10 | 2,500 | 250 |

This table shows the superior properties of the 4-brominated compound of this invention as compared with the corresponding non-brominated compound. There has been an increase of the therapeutic ratio, the lethal dose has been raised and the minimum active concentration has been lowered.

It is known that the white thrombi which form at sites of mechanical or other injury to the skin are principally composed of agglutinated (i.e. clotted) blood platelets which gradually fuse into a granular viscous substance. It is further known that a "vascular defect" occurs in advance of clotting, that such "defect" is related to platelet adhesiveness and that such adhesiveness is promoted by certain materials such as adenosine diphosphate (ADP).

As indicated above, it has now been found that the compound of this invention exhibits anticoagulation and antisludging properties (i.e. intravascular red cell aggregation). Apparently these properties result from the action of the compound of this invention in counteracting ADP action and diminishing platelet adhesiveness but this is a matter of theory and not essential to the present invention.

Various tests were performed which demonstrated the ability of the compound of this invention to decrease sludging and to increase the suspension stability of mammalian blood. One of the principal methods used was a quantitative determination of erythrocyte sedimentation rate in Westergreen tubes, using a series of dilutions of plasma or artificial colloids. One part of washed human erythrocytes was suspended in two parts of each dilution of suspension fluid. The logarithms of sedimentation rate after one hour were plotted against the logarithms of the colloids concentration in the respective tubes. The points were approximately on straight lines with nearly the same slopes. The points where the lines cut the abscissa gave the concentration of colloid which caused a sedimentation rate of 1 mm./hr. This parameter, called the "critical concentration," is dependent on the colloids concentration in individual tubes and is considered a quantitative measurement of the erythrocyte aggregation power of the plasma. When the colloid concentration is lower than critical, the erythrocyte aggregation disappears and when the concentration is raised, aggregation and sedimentation rate rise very rapidly.

For the determination of the anti-aggregation properties of the compound of this invention, a fixed aggregation force was chosen, giving a sedimentation rate of 40 mm./hr. (using 1% "Dextran"). Increasing concentrations of the compound were added and the inhibition of aggregation was represented by a decrease in the sedimentation rate, measured in terms of the control sample. The results are illustrated in the following table.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

TABLE

| Compound | Concentration in mgm./cc. blood | Sedimentation Rate (mm./hr.) | Percent Inhibition | Toxicity I.P $LD_{50}$ Mice |
|---|---|---|---|---|
| 6,6-dimethyl-2,3,5-trioxotetrahydropyran | 1 | 10 | 74 | 800 |
|  | 0.5 | 17 | 55 |  |
|  | 0.25 | 25 | 34 |  |
| 6-methyl-6-t-butyl-4-bromo-2,3,5-trioxotetrahydropyran | 1 | 1 | 98 | 2,000 |
|  | 0.5 | 4 | 91 |  |
|  | 0.25 | 16 | 66 |  |
| Control |  | 38 |  |  |

We claim:
1. 6-methyl-6-tert.butyl - 4 - bromo-2,3,5-trioxotetrahydropyran.

References Cited

UNITED STATES PATENTS 3,336,339   8/1967   England _____ 260—343.5

NICHOLAS S. RIZZO, *Primary Examiner.*

ALEX MAZEL, *Examiner.*

J. A. NARCAVAGE, *Assistant Examiner.*